J. H. MILLARD.
FOLDING AXLE.
APPLICATION FILED APR. 29, 1920.
1,358,092.
Patented Nov. 9, 1920.
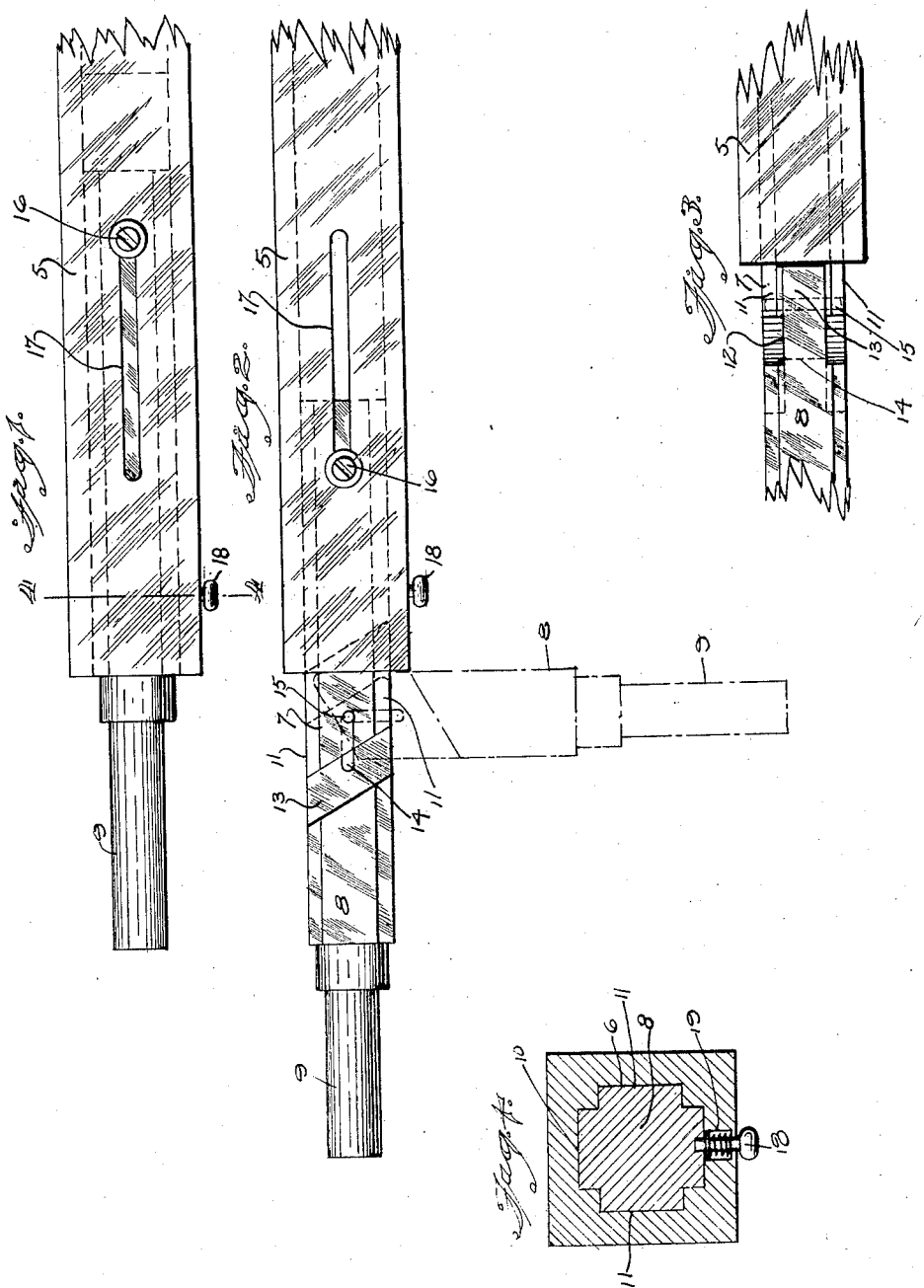

UNITED STATES PATENT OFFICE.

JAMES H. MILLARD, OF MIDDLEBURY, CONNECTICUT.

FOLDING AXLE.

1,358,092.      Specification of Letters Patent.      Patented Nov. 9, 1920.

Application filed April 29, 1920. Serial No. 377,469.

*To all whom it may concern:*

Be it known that I, JAMES H. MILLARD, a citizen of the United States, residing at Middlebury, in the county of New Haven and State of Connecticut, have invented a new and useful Improvement in Folding Axles; and I do hereby declare the following, when taken in connection with the accompanying drawings and the characters of reference marked thereon, to be a full, clear, and exact description of the same, and which said drawings constitute part of this application, and represent, in—

Figure 1, a top or plan view of a folding axle constructed in accordance with my invention, and shown with the movable axle in its retired or normal position.

Fig. 2, a similar view showing the movable axle drawn out and indicated as turned at right angles, by broken lines.

Fig. 3, a broken side view of the outer end of the fixed axle and a portion of the movable axle in its extended position.

Fig. 4, a sectional view on the line 4—4 of Fig. 1.

This invention relates to an improvement in folding axles for wheeled vehicles, and particularly to axles for folding-wheeled chairs, the object of the invention being to provide an axle which will be sufficiently strong for the purpose but which will permit the wheels to be folded with relation to the axle; and the invention consists in the construction as hereinafter described and particularly recited in the claims.

In carrying out my invention, I employ a fixed axle 5 connected with the vehicle in any suitable manner. In each end of this axle is a longitudinal opening 6 to receive the inner member 7 and outer member 8 of a wheel spindle, to the reduced end 9 of which a wheel is fixed in the usual manner. The openings in the axle are rectangular with a groove 10 in each side and the members 7 and 8 of the movable axle are formed with ribs 11 to enter the grooves 10 so as to form a close fit between them and the fixed axle. The outer end of the inner end of the movable axle 7 is formed with a transverse slot 12 to receive the inner end 13 of the outer member 8 which is reduced in thickness to fit the slot 12, and this reduced portion 13 is formed with a slot 14 to give clearance for a vertical pin 15 extending through the outer end of the inner member 7 so that the outer member 8 has a certain amount of longitudinal movement and permits the member 8 to be turned at right angles to the member 7, as shown in Fig. 2 of the drawings. The member 7 is limited in its movement by a screw 16 traveling in a slot 17 in the fixed axle, and the members of the movable axle may be locked to the fixed axle by means of a spring-pin 18 mounted in the fixed axle and entering a notch 19 formed for it in the outer member of the movable axle.

When the two members of the movable axle are in line, it may be readily pushed into the fixed axle and locked therein, and owing to the conformation of the movable axle and the opening in the fixed axle, a close fit is secured and the movable axle is firmly held against rotation. When it is desired to fold the wheels, the spring-pin 18 will be released so that the members of the movable axle may be drawn outward, and when drawn outward to the limit of their movement, the outer member 8 may be turned at right angles to the member 7 so that the wheel is turned at right angles to its normal or operating position.

I claim:

1. A folding axle for wheeled vehicles, comprising a fixed member formed in its ends with an opening, a movable axle formed in two parts and closely fitting the said opening, the said two parts of the movable axle coupled together.

2. A folding axle for wheeled vehicles, comprising a fixed axle formed with an opening in its ends, a movable axle formed in two parts and corresponding in transverse section to the opening in the fixed axle, said movable axle formed in two parts, one member formed with a transverse slot and the other with a reduced end to enter the said slot, the adjacent ends of the movable member coupled together, means to limit the outward movement of the movable axle, and means for locking the movable axle to the fixed axle.

In testimony whereof, I have signed this specification in the presence of two subscribing witnesses.

JAMES H. MILLARD.

Witnesses:
WM. FROMM,
ALBERT CLARK.